United States Patent
Miller et al.

[11] Patent Number: 6,167,056
[45] Date of Patent: Dec. 26, 2000

[54] ACCESS CHANNEL SLOT SHARING

[75] Inventors: David S. Miller, Carlsbad; Rajiv Vijayan, San Diego, both of Calif.; Ephraim Zehavi, Haifa, Israel; Jeffrey A. Levin, San Diego, Calif.

[73] Assignee: Qualcomm Incorporated, San Diego, Calif.

[21] Appl. No.: 09/189,357

[22] Filed: Nov. 9, 1998

Related U.S. Application Data

[60] Provisional application No. 60/065,169, Nov. 10, 1997.

[51] Int. Cl.[7] .............. H04B 7/216; H04J 3/06; H04L 27/30; H04L 7/00
[52] U.S. Cl. .......... 370/441; 370/320; 370/335; 370/350; 375/140; 375/367
[58] Field of Search .................. 370/320, 329, 370/330, 331, 335, 342, 441, 479, 350; 375/130, 140, 134, 367, 149

[56] References Cited

U.S. PATENT DOCUMENTS

| | | | |
|---|---|---|---|
| 5,103,459 | 4/1992 | Gilhousen et al. | 375/1 |
| 5,805,648 | 9/1998 | Sutton | 375/367 |
| 5,862,172 | 6/1999 | Sugita et al. | 370/335 |

FOREIGN PATENT DOCUMENTS

| | | | |
|---|---|---|---|
| 9849857 | 11/1998 | WIPO | H04Q 7/38 |

*Primary Examiner*—Huy D. Vu
*Assistant Examiner*—Kevin C. Harper
*Attorney, Agent, or Firm*—Phillip R. Wadsworth; Gregory D. Ogrod

[57] ABSTRACT

The present invention is a system and method for increasing user capacity on a slotted random access channel in a spread spectrum communications system by using a multi-part access probe. First and second parts of the access probe are modulated using a short PN code sequence, and the entire access probe is modulated using a long PN code sequence. Information to be transmitted by the access probe is modulated on the second part of the access probe, and the access probe is transmitted so that the first part of the probe falls within the boundaries of an access channel slot. In one embodiment, time slots in access channels used for access signal reception are made the length of the first part. In a further embodiment, time slots in a plurality of adjacent access channels used for access signal reception may be longer than said first part but are offset in time from each other by the length or period of the first part.

29 Claims, 8 Drawing Sheets

ACCESS CHANNEL SLOT SHARING

CROSS-REFERENCE TO RELATED APPLICATIONS

This application claims benefit of provisional application 60/065,169, filed Nov. 12, 1997.

This application is related to a commonly-owned U.S. Pat. No. 6,044,074, filed Jun. 16, 1998, entitled *"Rapid Signal Acquisition And Synchronization For Access Transmissions"* which issued Mar. 28, 2000 having which is incorporated herein by reference.

BACKGROUND OF THE INVENTION

1. Field of the Invention

The present invention relates generally to multiple access, spread spectrum, communication systems and networks. More particularly, the present invention relates to increasing user access capacity in a spread spectrum communication system.

2. Related Art

A variety of multiple access communication systems and techniques have been developed for transferring information among a large number of system users. However, spread spectrum modulation techniques, such as those used in code division multiple access (CDMA) communication systems provide significant advantages over other modulation schemes, especially when providing service for a large number of communication system users. Such techniques are disclosed in the teachings of U.S. Pat. No. 4,901,307, which issued Feb. 13, 1990 under the title *"Spread Spectrum Multiple Access Communication System Using Satellite or Terrestrial Repeaters,"* and U.S. Pat. No. 5,691,974, which issued Nov. 25, 1997, under the title *"Method and Apparatus for Using Full Spectrum Transmitted Power in a Spread Spectrum Communication System for Tracking Individual Recipient Phase Time and Energy,"* both of which are incorporated herein by reference.

The above-mentioned patents disclose multiple access communication systems in which a large number of generally mobile or remote system users each employ at least one transceiver to communicate with other system users or users of other connected systems, such as a public telephone switching network. The transceivers communicate through gateways and satellites, or terrestrial base stations (also sometimes referred to as cell-sites or cells).

Base stations cover cells, while satellites have footprints (also referred to as "spots") on the surface of the Earth. In either system, capacity gains can be achieved by sectoring, or subdividing, the geographical regions being covered. Cells can be divided into "sectors" by using directional antennas at the base station. Similarly, a satellite's footprint can be geographically divided into "beams," through the use of beam-forming antenna systems. These techniques for subdividing a coverage region can be thought of as creating isolation using relative antenna directionality or space division multiplexing. In addition, provided there is available bandwidth, each of these subdivisions, either sectors or beams, can be assigned multiple CDMA channels through the use of frequency division multiplexing (FDM). In satellite systems, each CDMA channel is referred to as a "sub-beam," because there may be several of these per "beam."

In communication systems employing CDMA, separate links are used to transmit communication signals to and from a gateway or base station. A forward link refers to the base station- or gateway-to-user terminal communication link, with communication signals originating at the gateway or base station and transmitted to a system user, or users. A reverse link refers to the user terminal-to-gateway or -base station communication link, with communication signals originating at a user terminal and transmitted to the gateway or base station.

The reverse link is comprised of at least two separate channels: an access channel and a reverse traffic channel. Generally, there are several access and reverse link traffic channels in a communication system. An access channel is used by one or more user terminals, separated in time, to initiate or respond to communications from a gateway or base station. Each such communication process is referred to as an access signal transmission or as an "access probe." The reverse traffic channels are used for the transmission of user and signaling information or data from user terminals to one or more gateways or base stations during a "call" or communication link setup. One structure or protocol for access channels, messages, and calls is illustrated in more detail in the Telecommunications Industry Association IS-95 standard entitled "Mobile Station-Base-Station Compatibility Standard For Dual-Mode Wideband Spread Spectrum Cellular System," which is incorporated herein by reference.

In a typical spread-spectrum communication system, one or more preselected pseudo-noise (PN) code sequences are used to modulate or "spread" user information signals over a predetermined spectral band prior to modulation onto a carrier for transmission as communication signals. PN spreading, a method of spread-spectrum transmission that is well known in the art, produces a signal for transmission that has a bandwidth much greater than that of the data signal. In the base station- or gateway-to-user terminal communication link, PN spreading codes or binary sequences are used to discriminate between signals transmitted by different base stations or over different beams, as well as between multi-path signals. These codes are typically shared by all communication signals within a given cell or sub-beam. In some communication systems, the same set of PN spreading codes are used in the reverse link for both the reverse traffic channels and the access channels. In other proposed communication systems, the forward link and the reverse link use different sets of PN spreading codes.

Generally, the PN spreading is accomplished using a pair of pseudonoise (PN) code sequences to modulate or "spread" information signals. Typically, one PN code sequence is used to modulate an in-phase (I) channel while the other PN code sequence is used to modulate a quadrature-phase (Q) channel in a technique commonly referred to as quadrature phase-shift keying (QPSK). The PN spreading occurs before information signals are modulated by a carrier signal and transmitted from the gateway or base station to the user terminal as communication signals on the forward link. The PN spreading codes are also referred to as short PN codes because they are relatively "short" when compared with other PN codes used by the communication system. Typically, the same set of PN spreading codes are shared by the forward and reverse link traffic channels and another set of PN spreading codes are used for the access channels as discussed above.

A particular communication system may use several lengths of short PN codes depending on whether the forward link or the reverse link channels are being used. In the forward link, such as in a satellite system, the short PN codes typically have a length from $2^{10}$ to $2^{15}$ chips. These short PN codes are used to discriminate between the various signal sources, such as gateways, satellites, and base stations. In addition, timing offsets within a given short PN code are used to discriminate between beams of a particular satellite, or cells and sectors in terrestrial systems.

In a proposed satellite communication system, the short PN codes used in the reverse link have a length on the order of $2^8$ chips. These short PN codes are used to enable a gateway or base station receiver to quickly search out user terminals that are trying to access the communication system without the complexity associated with the "longer" short PN codes used in the forward link. For purposes of this discussion, "short PN codes" refer to these short PN code sequences ($2^8$) to be used in the reverse link.

Another PN code sequence, referred to as a channelizing code, is used to discriminate between communication signals transmitted by different user terminals on the reverse link within a cell or sub-beam. The PN channelizing codes are also referred to as long codes because they are relatively "long" when compared with other PN codes used by the communication system. The long PN code typically has a length on the order of $2^{42}$ chips, but may be shorter or masked as desired. Typically, an access message is modulated by the long PN code prior to being modulated by the short PN code and subsequently transmitted as an access probe or signal to the gateway or base station. However, the short PN code and the long PN code may be combined prior to modulating or spreading the access message.

When a receiver at the gateway or base station receives the access probe, the receiver must despread the access probe to obtain the access message. This is accomplished by forming hypotheses, or predictions, as to which long PN codes and which short PN code pair were used to modulate the access message. A correlation between a given hypothesis and the access probe is generated to determine which hypothesis is the best estimate for the access probe. The hypothesis that produces the greatest correlation, generally relative to a predetermined threshold, is selected as a hypothesis of the most likely code and timing match. Once the selected hypothesis is determined, the access probe is despread using the selected hypothesis to obtain the access message.

In a communications system having many users, it is likely that more than one access probe will arrive at a gateway or base station simultaneously, or within a preselected period of time over which the signal is to be detected. When this happens, the access probes can collide or mutually interfere, rendering them unrecognizable to the gateway or base station. One way to avoid such collisions is to employ a centrally-controlled access technique, where the communications system schedules user terminal access probe transmissions. One disadvantage of such a technique is that a significant amount of access channel bandwidth is consumed by such a scheduling mechanism.

Another technique used to avoid such collisions is the slotted random access technique, such as the "slotted ALOHA" technique. In the slotted random access technique, a regular system-wide timing structure establishes permissible transmission or reception times. The access channel is usually divided into a series of fixed length frames or time "slots" or windows, each having the same fixed duration slots used for receiving signals. The access signals are generally structured as "packets", that consist of a preamble and a message portion, that must arrive at the beginning of a time slot to be acquired. A user terminal transmits at its own discretion, but is constrained to transmit only within the boundaries of a single slot to have a message received. The use of this technique on the access channel significantly decreases the possibility that access probes from different users will collide at a gateway or base station.

Unfortunately, the slotted random access technique also results in a significant amount of unused time on the access channel. Because an access probe must be transmitted within a single slot, the slot duration must be chosen to exceed the duration of the longest possible access probe. Because all slots are of the same duration, a slot will be partially empty for all but the longest access probe. The result is a substantial amount of wasted bandwidth on the access channel and a consequent reduction in the user capacity of the access channel.

A failure to acquire an access probe during a particular frame period results in the transmitter desiring access having to re-send the access probe to allow the receiver to detect the probe again during a subsequent frame. Multiple access signals arriving together "collide" and are not acquired, requiring both to be resent. In either case, the timing of subsequent access transmissions when the initial attempt fails is based on a delay time equal at a minimum to the length of the time slots, and generally to a random number of time slots or frames. Therefore, a significant amount of time passes before an access probe can again be resent and received. The length of the delay in probe acquisition is increased by any delay in resetting acquisition circuits in the receiver to scan the various hypothesis, and in other probes being acquired first, as mentioned. Ultimately, the access probe may never, at least not within a practical time limit, be acquired if the timing uncertainty is not resolved.

What is needed is a system and method for increasing user capacity on a slotted random access channel in a spread spectrum communication system. It is preferable that the technique allow access probes to be received with minimum delay and efficiency.

SUMMARY OF THE INVENTION

The present invention is a system and method for increasing user capacity on a slotted random access channel in a spread spectrum communications system using a multi-part access probe. The present invention also has the advantage that it reduces delays in achieving access after an initial access failure.

The invention is realized in a method and apparatus for transmitting a plurality of access signals over at least one access channel, each including preamble and message portions with the preamble having first and second stages. The access probe preamble does not contain message information but is comprised of null data.

The access signal is generated by modulating the first stage and second stages of the preamble by a first signal; modulating the second stage of the preamble also by a second signal; and modulating the message with said first signal and said second signal. The access signal is then transmitted in the form of the modulated first stage, second stage, and message. The access signals thus formed can be transmitted and received over an access channel divided into time slots so that the preamble falls within one of a plurality of preselected time slots. The result is that when more than one access signal is transmitted in time such that a second stage or message portion overlaps the first stage of one or more other transmitted access signals, it can still be acquired.

In a preferred embodiment, the access signals can be transmitted and received over an access channel divided into signal reception time slots that are substantially the same length as said first stage. Alternatively, the access signals can be received over a plurality of an access channels divided into signal reception time slots that are time offset from each other by a period substantially the same length as said first stage.

The first part of the access probe is preferably formed by first modulating or spreading the access signal using a short PN sequence, which is also used to spread the second part. In a preferred embodiment, the short PN sequence is a pair of quadrature short PN sequences. This spreading is generally accomplished using apparatus for transmitting the multi-part access probe having first and second PN code modulators, a data modulator, and a transmitter.

The first PN code modulator spreads first and second parts of the access probe with the desired short PN sequence while the second PN code modulator spreads the second part of the access probe with a long PN sequence. The data modulator modulates the second part with the access message. The transmitter then transmits the access probe so that the first part falls within one of the access channel slots.

The apparatus for receiving the multi-part access probe includes a plurality of demodulators and a searcher receiver. The searcher receiver acquires the first part of the access probe and transfers further processing of the probe, that is the second part, to one of the demodulators. The searcher receiver can then acquire the first part of another access probe while the demodulator demodulates the second part of the first access probe. This process can be repeated, acquire and hand-off, for as many access probes as can be received, demodulated and can be acquired, during any given time interval.

BRIEF DESCRIPTION OF THE DRAWINGS

The present invention is described with reference to the accompanying drawings in which like reference numbers indicate identical or functionally similar elements, and the left-most digits of a reference number identify the drawing in which the reference number first appears.

DETAILED DESCRIPTION OF THE PREFERRED EMBODIMENTS

The present invention is a system and method for increasing user capacity on a slotted random access channel in a spread spectrum communications system by using a multi-part access probe. The present invention also decreases delay in resending unsuccessful access probes or signals. In one embodiment of the present invention, the access probe is transmitted from a user terminal to a gateway or base station.

Although the invention is described in detail in terms of specific embodiments, various modifications can be made without departing from the scope of the invention. For example, the invention is equally suited for transmissions other than access channel transmissions that are spread with multiple PN code sequences. Further, the communications channel of the present invention is not limited to the air link described, but can be employed over wire, fiber optic cable, and the like.

In a typical CDMA communication system, a base station within a predefined geographical region, or cell, uses several spread spectrum modems or transmitter and receiver modules to process communication signals for system users within the service area. Each receiver module generally employs a digital spread spectrum data receiver and at least one searcher receiver as well as associated demodulators and the like. During typical operations, a particular transmitter module and a particular receiver module, or a single modem, in the base station are assigned to a user terminal to accommodate transfer of communication signals between the base station and the user terminal. In some cases, multiple receiver modules or modems may be used to accommodate diversity signal processing.

For communication systems employing satellites, the transmitter and receiver modules are generally placed in base stations referred to as gateways that communicate with system users by transferring communication signals through the satellites. In addition, there may be other associated control centers that communicate with the satellites or the gateways to maintain system-wide traffic control and signal synchronization.

I. System Overview

Figure 1:
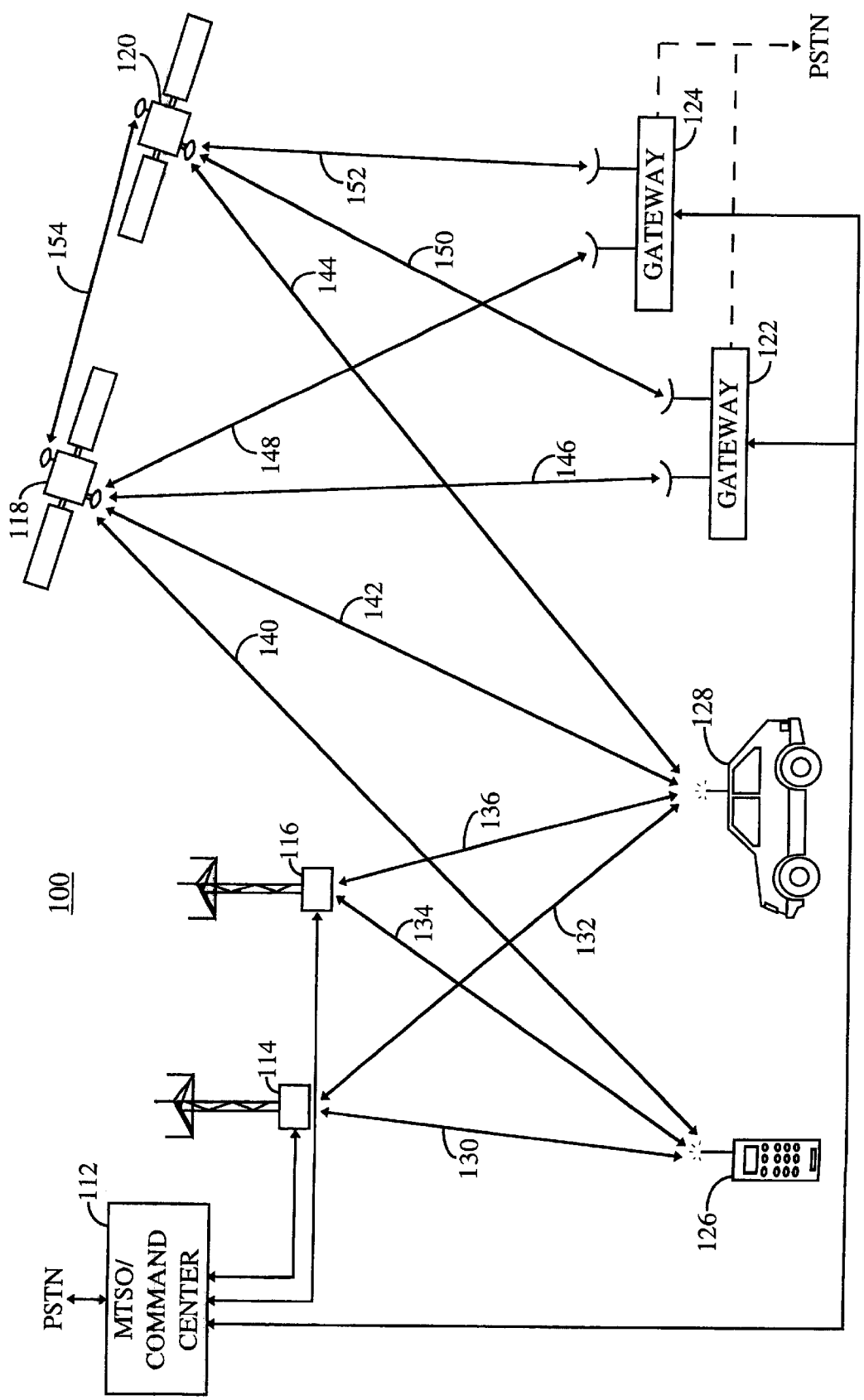
FIG. 1 illustrates an exemplary wireless communication system constructed and operating according to one embodiment of the present invention.

An example of a wireless communication system constructed and operating according to the present invention is illustrated in FIG. 1. A communication system 100 utilizes spread spectrum modulation techniques in communicating with user terminals (shown as user terminals 126 and 128). In terrestrial systems, communication system 100 communicates with mobile stations or user terminals 126 and 128 using base stations (shown as base stations 114 and 116). Cellular telephone type systems in large metropolitan areas may have hundreds of base stations 114 and 116 serving thousands of user terminals 126 and 128.

In satellite-based systems, communication system 100 employs satellite repeaters (shown as satellites 118 and 120) and system gateways (shown as gateways 122 and 124) to communicate with user terminals 126 and 128. Gateways 122 and 124 send communication signals to user terminals 126 and 128 through satellites 118 and 120. Satellite-based systems generally employ fewer satellite repeaters to service more users over a larger geographical region than comparable terrestrial systems.

Mobile stations or user terminals 126 and 128 each have or comprise a wireless communication device such as, but not limited to, a cellular telephone, a data transceiver or a transfer device (e.g., computers, personal data assistants, facsimile). Typically, such units are either hand-held or vehicle mounted as desired. While these user terminals are discussed as being mobile, it is also understood that the teachings of the invention are applicable to fixed units or other types of terminals where remote wireless service is desired. This latter type of service is particularly suited to using satellite repeaters to establish communication links in many remote areas of the world. User terminals are also sometimes referred to as subscriber units, mobile units, mobile stations, or simply "users," "mobiles," or "subscribers" in some communication systems, depending on preference.

Exemplary user terminals are disclosed in U.S. Pat. No. 5,691,974 referenced above, and U.S. Pat. No. 5,835,847 which issued Nov. 10, 1998 and is entitled *"Pilot Signal Strength Control For A Low Earth Orbiting Satellite Communications System,"* and 08/723,725 entitled *"Unambiguous Position Determination Using Two Low-Earth Orbit Satellites,"* which are incorporated herein by reference.

It is contemplated for this example that satellites 118 and 120 provide multiple beams within 'spots' that are directed to cover separate generally non-overlapping geographic regions. Generally, multiple beams at different frequencies, also referred to as CDMA channels, 'sub-beams' or FDM signals, frequency slots, or channels, can be directed to overlap the same region. However, it is readily understood that the beam coverage or service areas for different satellites, or antenna patterns for terrestrial cell-sites, may overlap completely or partially in a given region depending on the communication system design and the type of service being offered, and space diversity may also be achieved between any of these communication regions or devices. For example, each may provide service to different sets of users with different features at different frequencies, or a given mobile unit may use multiple frequencies and/or multiple service providers, each with overlapping geophysical coverage.

As illustrated in FIG. 1, communication system 100 generally uses a system controller and switch network 112, also referred to as a mobile telephone switching office (MTSO), in terrestrial systems and (Ground) Command and Control centers (GOCC) for satellite systems, which also communicate with the satellites. Such controllers typically include interface and processing circuitry for providing system-wide control for base stations 114 and 116 or gateways 122 and 124 over certain operations including PN code generation, assignments, and timing. Controller 112 also controls routing of communication links or telephone calls among a public switched telephone network (PSTN), and base stations 114 and 116 or gateways 122 and 124, and user terminal 126 and 128. However, a PSTN interface generally forms part of each gateway for direct connection to such communication networks or links.

The communication links that couple controller 112 to various system base stations 114 and 116 or gateways 122 and 124 can be established using known techniques such as, but not limited to, dedicated telephone lines, optical fiber links, and microwave or dedicated satellite communications links.

While only two satellites are illustrated in FIG. 1, the communication system generally employs multiple satellites 118 and 120 traversing different orbital planes. A variety of multi-satellite communication systems have been proposed including those using a constellation of Low Earth Orbit (LEO) satellites for servicing a large number of user terminals. However, those skilled in the art will readily understand how the teachings of the present invention are applicable to a variety of both terrestrial and satellite system configurations.

In FIG. 1, some of the possible signal paths for communication links between base stations 114 and 116 and user terminals 126 and 128 are illustrated as lines 130, 132, 134, and 136. The arrowheads on these lines illustrate exemplary signal directions for the link, as being either a forward or a reverse link, and serve as illustration only for purposes of clarity and not as any restriction on the actual signal pattern.

In a similar manner, signal paths for communication links among gateways 122 and 124, satellite repeaters 118 and 120, and user terminals 126 and 128 are illustrated as lines 146, 148, 150, and 152 for gateway-to-satellite links and as lines 140, 142, and 144 for satellite-to-user links. In some configurations, it may also be possible and desirable to establish direct satellite-to-satellite links exemplified by line 154.

As will be apparent to one skilled in the art, the present invention is suited for either terrestrial-based systems or satellite-based systems. Thus, gateways 122 and 124 and base stations 114 and 116 will henceforth be collectively referred to as gateway 122 for clarity. The terms base station and gateway are sometimes used interchangeably in the art, with gateways being perceived as specialized base stations that direct communications through satellites. Likewise, satellites 118 and 120 will be collectively referred to as satellite 118, and user terminals 126 and 128 will be collectively referred to as user terminal 126.

II. Communication Links

Figure 2:
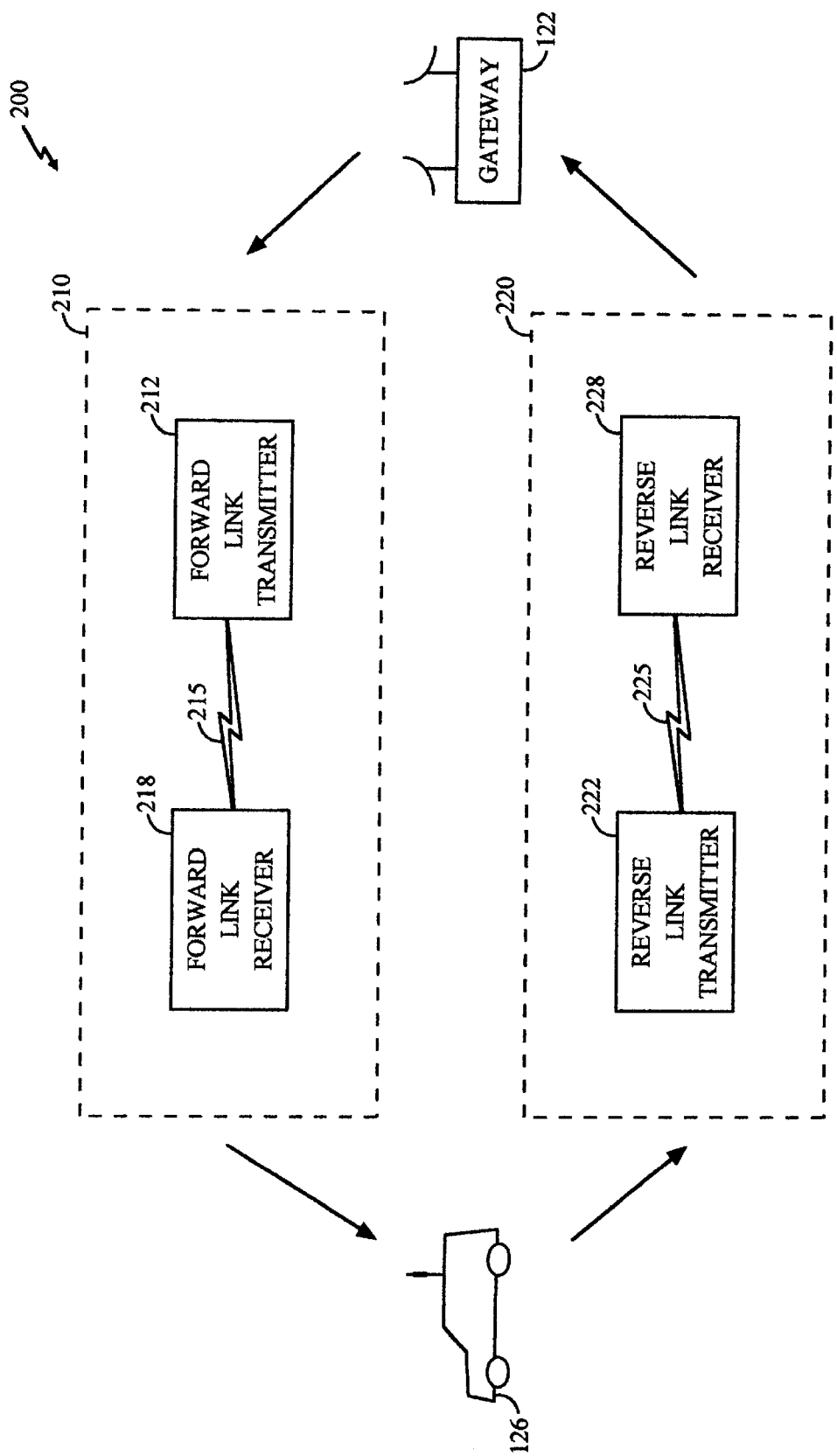
FIG. 2 illustrates an exemplary implementation of communication links used between a gateway and a user terminal in the communication system of FIG. 1.

FIG. 2 illustrates an example implementation of communication links used between a gateway 122 and a user terminal 126 in communication system 100. Two links are employed in communication system 100 to facilitate the transfer of communication signals between gateway 122 and user terminal 126. These links are referred to as a forward link 210 and a reverse link 220. Forward link 210 handles transmission signals 215 that are transmitted from gateway 122 to user terminal 126. Reverse link 220 handles transmission signals 225 that are transmitted from user terminal 126 to gateway 122.

Forward link 210 includes a forward link transmitter 212 and a forward link receiver 218. In one embodiment, forward link transmitter 212 is implemented in gateway 122 according to well-known CDMA communication techniques as disclosed in the above-referenced patents. In one embodiment, forward link receiver 218 is implemented in user terminal 126 according to well-known CDMA communication techniques as disclosed in the above referenced patents.

Reverse link 220 includes a reverse link transmitter 222 and a reverse link receiver 228. In one embodiment, reverse link transmitter 222 is implemented in user terminal 126. In one embodiment, reverse link receiver 228 is implemented in gateway 126.

As discussed above, reverse link 220 uses at least two channels, including one or more access channels and one or more reverse traffic channels. These channels may be implemented by separate receivers or the same receiver operating in distinct modes. As discussed above, an access channel is used by user terminals 126 to initiate, or respond to, communications with gateway 122. A separate access channel is required at any given time for each active user. In particular, access channels are time-shared by several user terminals 126 with transmissions from each active user being separated in time from one another. The structure of access channels and signals is discussed in further detail below.

Systems may employ more than one access channel depending upon known factors such as a desired level of gateway complexity and access timing. In a preferred embodiment, 1 to 8 access channels are employed per frequency. In preferred embodiments, different sets of PN spreading codes are used between the reverse traffic channels and the access channels. In addition, the access channels can employ very short PN codes, chosen from a unique set of codes (or code generators), assigned only for the use of access channels throughout communication system 100. This latter technique provides a very efficient mechanism for quickly acquiring access signals at gateways in the presence of signal delay and Doppler and other known effects.

III. Access Channel

Figure 3:
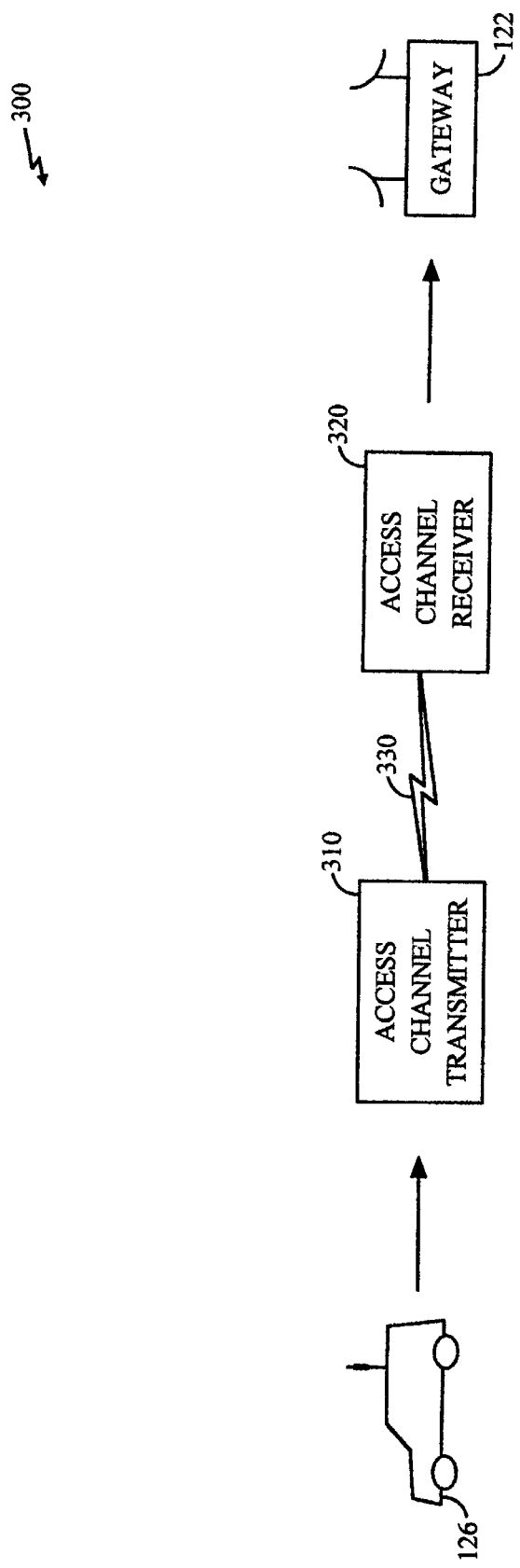
FIG. 3 illustrates the structure of an access channel in more detail.

FIG. 3 illustrates an access channel 300 in further detail. Access channel 300 includes an access channel transmitter 310, an access channel receiver 320, and an access signal or probe 330. Access channel transmitter 310 can be included in reverse link transmitter 222 described above. Access channel receiver 320 can be included in reverse link receiver 228 described above.

Access channel 300 is used for short signaling message exchanges including call origination, responses to pages, and registrations originated from user terminal 126 and destined for gateway 122. In order for user terminal 126 to initiate or respond to communications with gateway 122 over access channel 300, a signal referred to as access probe 330 is sent.

An access channel is also generally associated with one or more particular paging channels used in the communication system. This makes responses to paging messages more efficient in terms of the system knowing where to look for user terminal access transmissions in response to pages. The association or assignment may be known based on a fixed system design, or indicated to user terminals within the structure of paging messages.

IV. Timing Uncertainty in Access Probe

An uncertainty in the timing of access probe 330 arises due to the changing distance or propagation path length between user terminal 126 and satellite 118 as a result of the orbit of satellite 118 around the Earth. This timing uncertainty is bounded by a minimum propagation delay and a maximum propagation delay. The minimum propagation delay is the amount of time required for a signal to travel from user terminal 126 to satellite 118 (and a gateway) generally when satellite 118 is directly above user terminal 126. The maximum propagation delay is the amount of time required for a signal to travel from user terminal 126 to satellite 118 when satellite 118 is located at a predetermined useful horizon of user terminal 126. The total delay is also affected by the position of the gateway relative to the satellite, and may change the satellite position at which maxima or minimums occur. In a similar manner, some degree of timing uncertainty can arise for relative motion between a user terminal and base station 114 or other signal sources, although generally of lesser magnitude, depending on the relative motion.

Resolving the timing uncertainty is necessary in order to properly acquire access probe 330. Specifically, the PN code phase and timing, that is, the time of the start of the PN code sequences, must be known in order to despread the long and short PN codes used in forming access probe 330. This is done by correlating access probe 330 with various timing (and code as appropriate) hypotheses to determine which timing hypothesis is the best estimate for acquiring access probe 330. The timing hypotheses are offset in time (and frequency for Doppler effects) from one another and represent various estimates of the timing of access probe 330, or of the PN codes used to generate the access signal. The hypothesis that generates the highest correlation with access probe 330, generally one that exceeds a predetermined correlation threshold, is the hypothesis with the most likely estimate (assumed "correct" or appropriate) of the timing to use for that particular access probe 330. Once the timing uncertainty is resolved in this manner, access probe 330 can be despread using the resolved timing and the long and short PN codes according to well-known techniques.

V. System Timing for Access Probe Transmission

Figure 4:
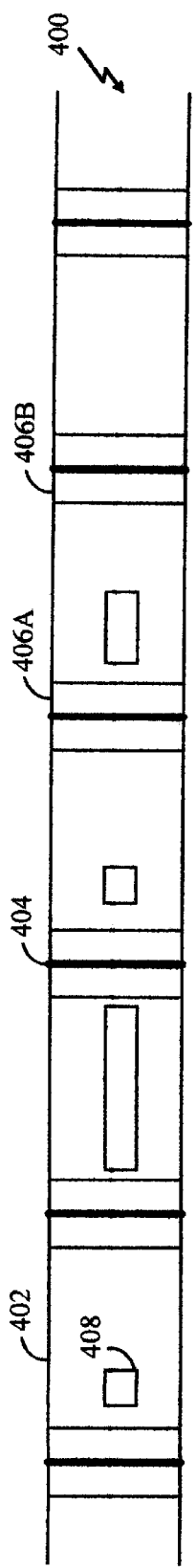
FIG. 4 is a timing diagram depicting a typical timing structure for access probes in a conventional slotted random access channel.

The usual access technique for an access signal is a slotted random access known as "slotted ALOHA." According to this technique, communication system 100 establishes a regular timing structure on the access channel to coordinate access probe transmissions. FIG. 4 is a timing diagram depicting a typical timing structure for access signals or probes in a conventional slotted random access channel 400. Channel 400 comprises access slots 402, boundaries 404, guard bands 406 and access probes 408. Channel 400 is divided into time blocks of equal duration known as access slots 402 having boundaries 404. In a preferred embodiment, each access slot 402 includes a leading guard band 406A and a trailing guard band 406B to accommodate the timing uncertainties described above.

When a user terminal desires to access communication system 100, that is, initiate or respond to communications, the user terminal transmits access signal or probe 408 to gateway 122. Conventional access probe 408 includes an access preamble and an access message, and is transmitted by access channel transmitter 310 in user terminal 126 to access channel receiver 320 in gateway 122. In a conventional spread spectrum system, the preamble and access message are both quadrature spread with a pair of short PN codes and channelized with the long PN code. The preamble typically comprises null data, that is, all "1"s or all "0"s, or a pre-selected pattern of "1's" and "0's". The preamble is transmitted first to provide access channel receivers with an opportunity to acquire access probe 408 prior to the access message being sent. When access channel receiver 320 receives the preamble, access channel receiver 320 must despread it using the short PN code pair and the long PN code. Once the short PN and long codes are determined by access channel receiver 320, the access probe is referred to as being acquired. After the preamble has been transmitted for a predetermined period of time, the access message is transmitted by access channel transmitter 310. The access message is spread using the same short PN code pair and long PN code used to spread the preamble.

The preamble must be of sufficient length so that access channel receiver 320 has time to process the hypotheses and acquire the access probe before the access message is transmitted. Otherwise, access channel receiver 320 will still be attempting to acquire the access probe while the access message is being transmitted. In this case, the access message will not be properly received. The time required to acquire an access probe, referred to as acquisition time, varies depending on how many receivers are used in parallel to process the hypotheses, how long the various code sequences are, the range of timing uncertainty in the signal transmissions, and so forth. In addition, the length and frequency of repetition of the preamble is selected in order to minimize collisions between access probes transmitted by different user terminals. Each of these factors are considered based on system design considerations when determining the length of the preamble as would be apparent.

Access probes of conventional design mutually interfere if transmitted simultaneously. For this reason, only one conventional access probe can be successfully received during one access slot on a slotted random access channel. Because access slots are not reserved for particular users, a user can transmit during any access slot. The user then waits for an acknowledgment from the receiver before transmitting another message. If no acknowledgment is received after a predetermined period, the user assumes that the access probe has collided with an access probe from another user, or simply not been received, and retransmits the access message.

Access slot duration (less guard bands) in a conventional slotted random access channel is selected to exceed the length of the longest possible access probe. Conventional access probes are then transmitted so as to fall completely within one access slot 402. This arrangement reduces the likelihood of collisions to some extent. However, this arrangement also causes a significant amount of access channel 400 to go unused. Because it is costly to add communication channels, it is desirable to minimize the unused portion of any communication channel, especially one used to gain access to a system or setup communication links.

Figure 5:
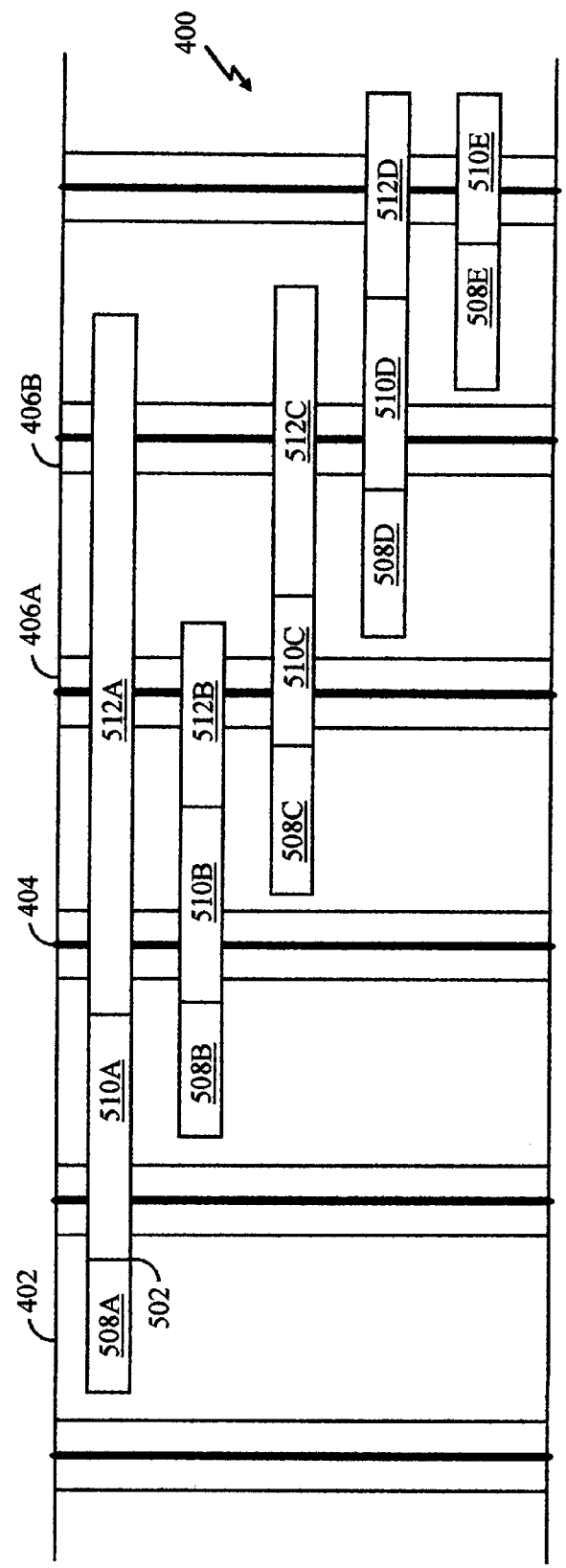
FIG. 5 is a timing diagram for access probes in a slotted random access channel according to a preferred embodiment of the present invention.

FIG. 5 is a timing diagram for access probes in a slotted random access channel according to a preferred embodiment of the present invention. In FIG. 5, conventional access probes 408 have been replaced by multi-part access probes 502 according to the present invention. Such a multi-part access probe is disclosed in detail in a copending, commonly-owned application, filed Jun. 16, 1998, entitled "Rapid Signal Acquisition and Synchronization For Access Transmissions," which issued as U.S. Pat. No. 6,044,074, which is incorporated herein by reference. As described below, such multi-part access probes can partially overlap under certain conditions. This technique not only significantly reduces the unused portion of access channel 400, but also permits multiple access probes 502 to share the access channel 400 at substantially the same time, at least for a certain period. One fundamental difference between the invention and conventional protocol 400 is that the preamble is initially spread with only short PN code pair, and later with both the short PN code and long PN code. This allows access channel receiver 320 to resolve the timing uncertainty using only short PN code pair 620. In contrast, conventional protocol 400 requires the use of both short PN code pair 620 and long PN code 622 to resolve timing uncertainty.

Figure 6:
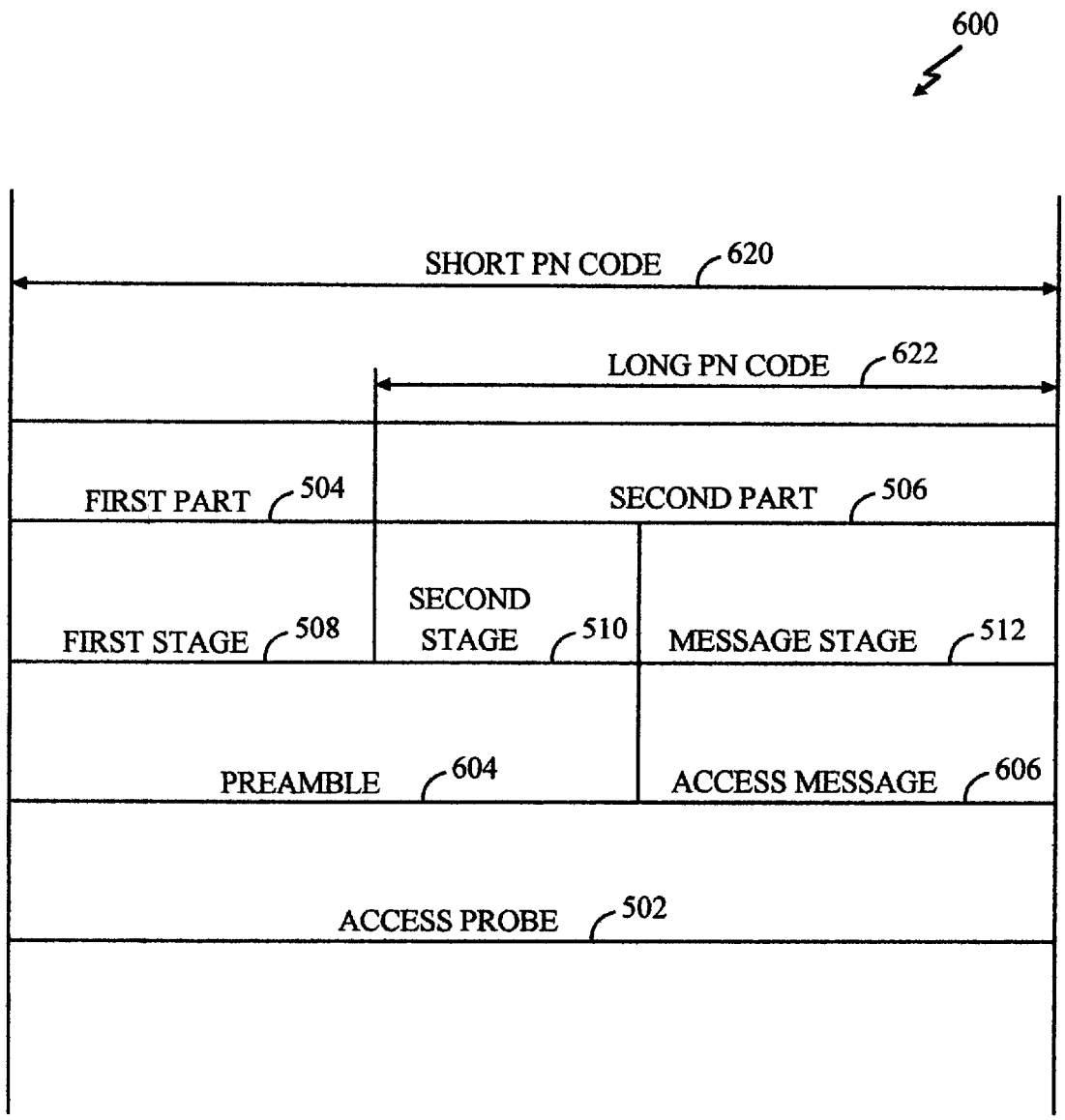
FIG. 6 illustrates a protocol for generating an access probe according to one embodiment of the present invention.

VI. Protocol for Transmitting an Access Probe According to the Present Invention FIG. 6 illustrates a protocol or process structure 600 for generating an access probe 502 according to one embodiment of the present invention. In protocol 600, access probe 502 includes an access probe preamble (preamble) 604 and an access probe message (access message) 606. According to the present invention, preamble 604 is transmitted in two stages: a first stage 508 and a second stage 510. Access message 606 is transmitted in a single message stage 512. Stages 508, 510 and 512 are grouped into two parts for modulation purposes: first part 504 and second part 506. First part 504 includes first stage 508, and is spread with a short PN code 620. Second part 506 includes second stage 510 and message stage 512, and is spread with short PN code 620 and a long PN code 622. In a preferred embodiment, short PN code 620 is a pair of quadrature PN codes and is used to spread the signal using well-known techniques. In one embodiment, the PN code sequence used to spread a Q channel can be a delayed version of the PN code sequence used to spread the I channel, although separate codes are preferred.

In first stage 508, preamble 604 of access probe 502 is spread by short PN code 620 for a length of time sufficient to allow access channel receiver 320 to determine the timing of short PN code 620. Preamble 604 can comprise any bit pattern that facilitates acquisition of access probe 502. In a preferred embodiment, the bit pattern for preamble 604 is null data, such as a bit pattern of all ones, all zeros, or a pre-selected pattern of "1's" and "0's". In order to facilitate rapid acquisition of access probe 502 by gateway 122, long PN code 622 is not used to spread first stage 508.

In second stage 510, preamble 604 of access probe 502 is spread by short PN code 620, as for first stage 508. Preamble 604 is also spread by long code 622 to facilitate synchronization of the long code by gateway 122. When user terminal 126 attempts an access on a specific access channel, long code 622 includes a mask associated with that access channel, creating a pseudo-orthogonal PN code. The gateway uses the same mask to demodulate signals for that specific access channel. By the end of second stage 510, access channel receiver 320 should have acquired access probe 502.

Access messages can be encoded in a similar fashion to data on the typical traffic channels which is M-ary modulated using a set of orthogonal codes such as Walsh functions. The data could also be modulated using single Walsh functions, although the timing uncertainty generally works against this approach.

In an alternative embodiment, during message stage 512, the message data is modulated by one or more orthogonal codes selected from a set of orthogonal codes, then spread by short code 620, and spread by long code 622. An exemplary set of orthogonal PN codes is disclosed in a commonly-owned copending U.S. patent application Ser. No. 08/627,831, entitled "Using Orthogonal Waveforms to Share a Single CDMA Channel" (PA), which is incorporated herein by reference.

Two access probes 502 generated using protocol 600 can collide or mutually interfere under certain conditions. For example, two signals modulated with the same short PN code 620 will mutually interfere if the difference in their arrival times at access channel receiver 320 is less than one-half of a chip, modulo 256 chips. Therefore, two access probes 502 can collide if their first stages 508 are transmitted to be received within the same access slot 402.

Further, two signals modulated with the same short PN code 620 and the same long code 622 will mutually interfere under certain conditions. Specifically, two signals modulated with the same short PN code 620 and the same long PN code 622 will mutually interfere if the difference in their arrival times at access channel receiver 320 is less than one-half of a chip, modulo 256 chips. Therefore, two access probes 502 can mutually interfere if their second stages 510 are transmitted to be received within the same access slot 402.

However, signals modulated with short PN codes 620 only do not collide with signals also modulated with long PN code 622. Therefore, the first stage 508 of one access probe can occupy the same access slot 402 as the second stage 510 and/or the message stage 512 of another access probe.

Further, signals modulated with one orthogonal code (when used) do not mutually interfere with signals modulated with other orthogonal codes selected from the same set of orthogonal spreading codes. Therefore, the message stage 512 of one access probe can occupy the same access slot 402 as the message stage 512 of another access probe.

Therefore, according to the present invention, access probes 502 can share an access slot 402, or a portion thereof. Thus, when the slotted random access technique is observed for the first stage 508 of each access probe 502, and the arrival times of the second stages of access probes 502 do not coincide as described above, communications signals modulated according to the protocol of FIG. 6 can partially overlap, as shown in FIG. 5. This allows use of slot time that is otherwise wasted or unavailable. Thus, the present invention results in more efficient usage of communications channels.

Furthermore, the length of each access slot has normally been defined as the sum of the lengths of each portion of an access signal, that is the preamble and message portions, plus guard bands (if used) (stage 508+stage 508+512). This provides the number of slots over a given time period that are available. The number of available access channels on a given frequency is limited by the number of short PN codes. Together, these facts provide the number of time slots in which users can attempt to access communication system 100. However, with the present invention, the number of access channels can be effectively increased.

For example, the fact that portions or stages of access probes can overlap can be used to create multiple access channels. That is, access channels can be formed which are based on or use short PN codes whose timing structure is shifted by a preselected time period dedicated or used for the first portion of the preamble (short PN spread only). The channels use the same short PN codes time shifted from each other such that the various portions of adjacent access signals or probes that can be received do not coincide. An access probe can be received in one channel while another channel receives another access probe that uses the same short PN code but has a time offset, the length of the first preamble stage or greater, so that the two signals do not collide. The reception of the second preamble stage and the message portion will not cause a collision in this scheme, and those portions do not need to be accounted for directly in establishing the channel offsets. The receivers can establish the channels according to time shifted PN codes they use for hypothesis in the signal acquisition and demodulation processes. Depending on the length of the time used for the time offsets to assure preamble reception, and any desired guard bands, as before, it is estimated that at least two or three times as many channels can be created in the same frequency space.

However, a preferred embodiment of the invention recognizes that alternatively the total (fixed) length of each of the slots can be reduced to the period of the short PN code, plus guard bands or extra time as desired for system performance. Since the access probes should not collide except for over this short period of time when the same short PN codes are used, longer time slots are not necessary to distinguish, acquire, and demodulate access signals. This allows a greater number of access slots per channel (also referred to as channels in some systems) to in effect be created on the access channels or frequencies. This technique provides for increased access channel capacity and ease of access without increasing the complexity of hardware or control systems used to create and monitor the access channels.

VII. Access Channel Transmitter

Figure 7:
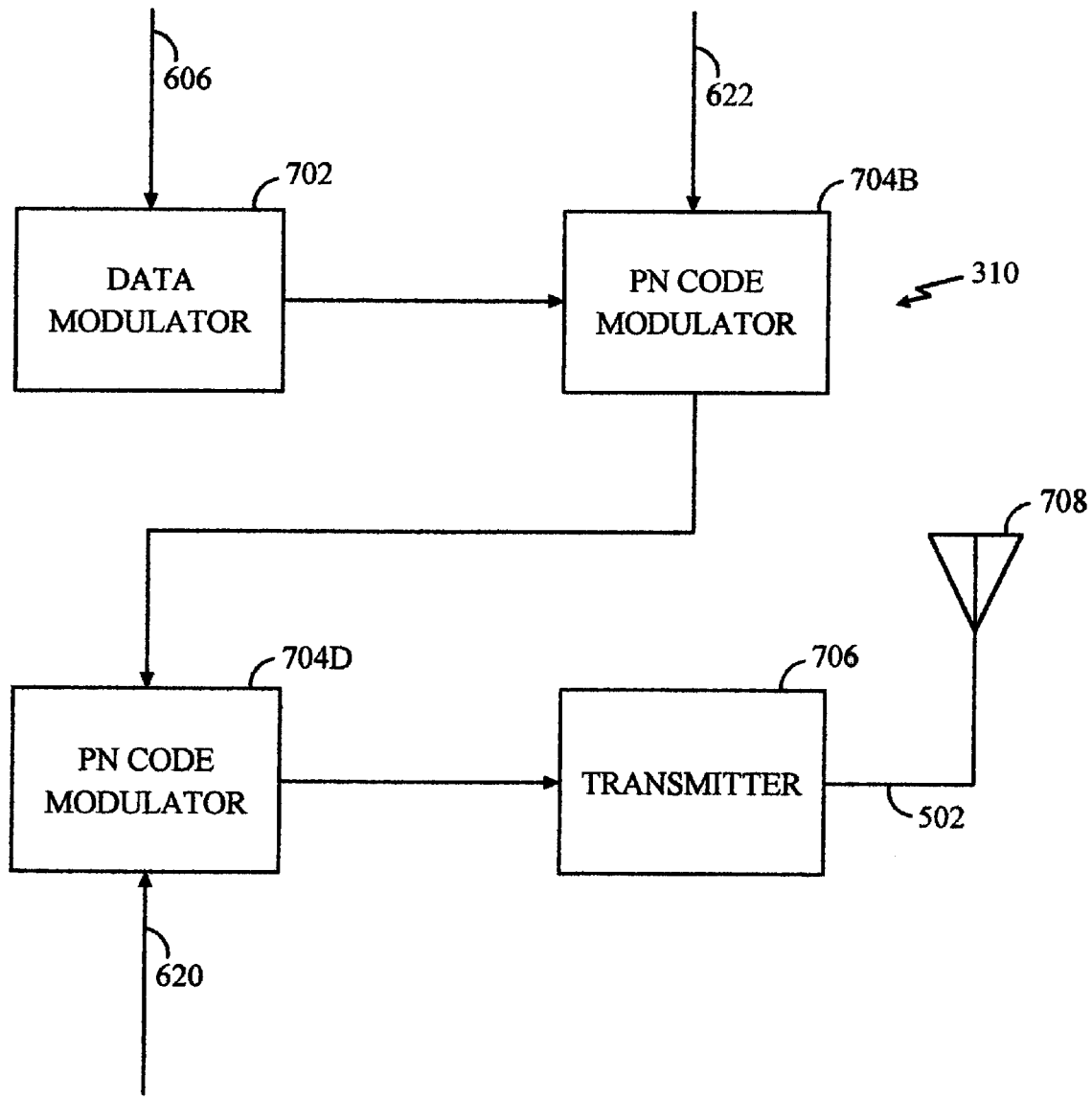
FIG. 7 is a block diagram for an exemplary access channel transmitter used for transmitting an access probe according to one embodiment of the present invention.

FIG. 7 is a circuit block diagram for an exemplary access channel transmitter 310 for transmitting an access probe 502 according to the protocol or signal structure of FIG. 6. Access channel transmitter 310 includes a data modulator 702, PN code modulators 704, transmitter 706 and antenna 708.

Figure 8:
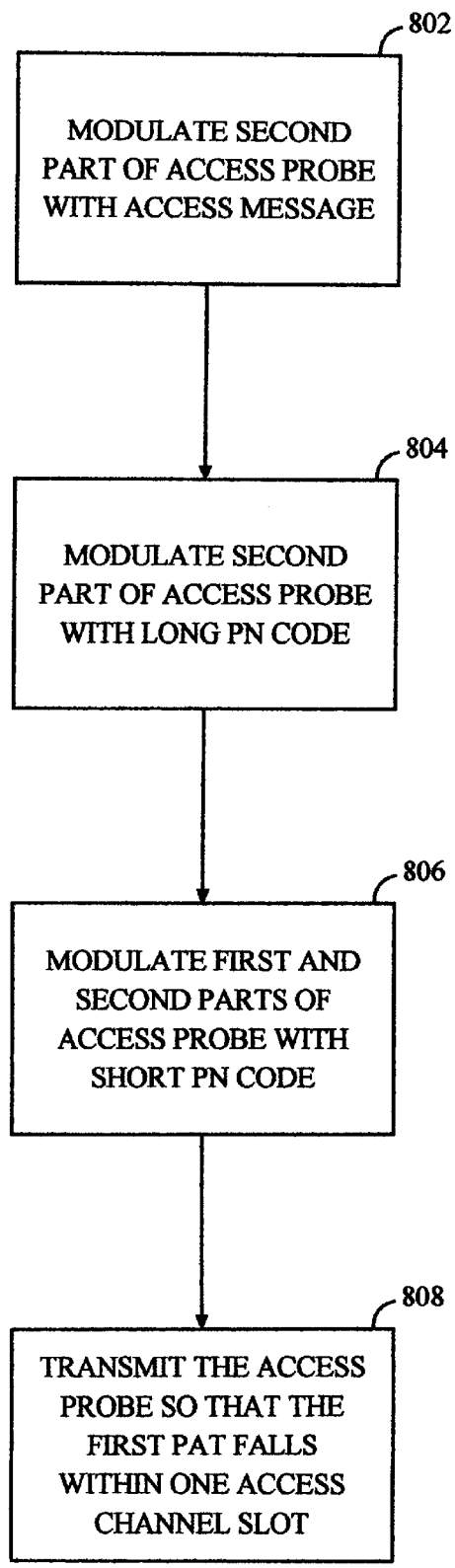
FIG. 8 is a flowchart of the operation of an access channel transmitter according to one embodiment of the present invention.

FIG. 8 is a flowchart describing the operation of the circuit of FIG. 7. In a step 802, data modulator 702 modulates a carrier signal (baseband) of conventional design (not shown) with an access message to produce a message stage 512 of second part 506 of access probe 502. In a step 804, PN code modulator 704A modulates a portion of the signal produced by data modulator 702 using long PN code 622 to produce second part 506 of access probe 502. In a step 806, PN code modulator 704B modulates first part 504 and second part 506 of the signal produced by PN code modulator 704A using short PN code 620. In a step 808, transmitter 706 transmits access probe 502 via antenna 708 so that first part 504 of access probe 502 falls completely within one access slot 402.

VIII. Access Channel Receiver

Figure 9:
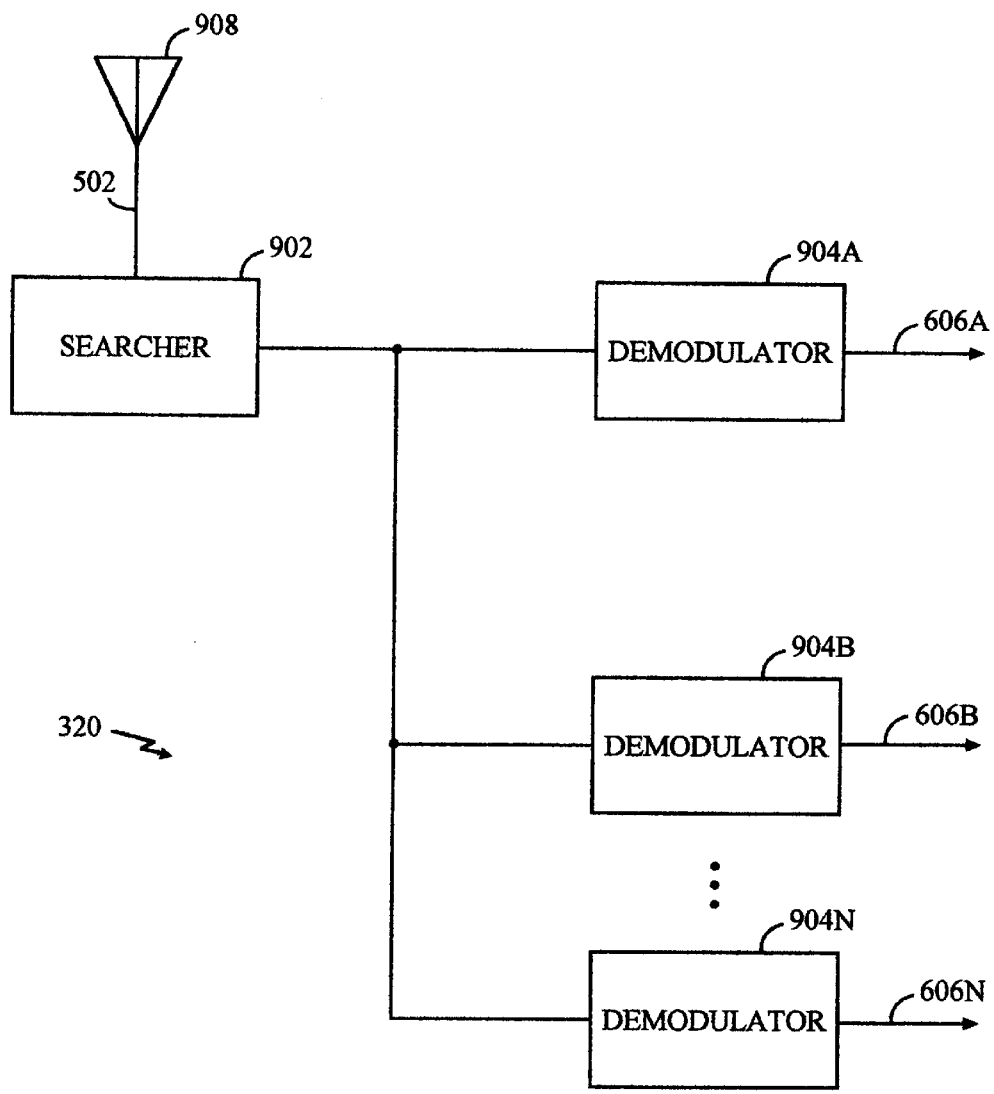
FIG. 9 is a block diagram for an exemplary access channel receiver for receiving an access probe according to one embodiment of the present invention.

FIG. 9 is a circuit block diagram for an exemplary access channel receiver 320 for receiving an access probe 502 according to the protocol of FIG. 6. Access channel receiver 320 includes a searcher 902, demodulators 904A–904N, and antenna 908. The two-stage architecture of access channel receiver 320 is ideal for processing the multi-part access probe of the present invention in a pipeline manner, as described below.

In operation, searcher 902 receives access probe 502 using antenna 908 and acquires preamble 604. Preamble 604 is acquired by acquiring short PN code 620 and long PN code, as described above, and despreading access probe 502. When searcher 902 has acquired preamble 604, searcher 902 transfers the despread access probe to one of the demodulators 904A–904N. Demodulator 904 demodulates the despread access probe to obtain access message 606.

Because preamble 604 and access message 606 are obtained by separate functional units, they can occur simultaneously for different access probes. That is, more specifically, a demodulator 904(904A–904N) can demodulate an access message of one access probe while searcher 902 acquires the preamble of another access probe. This arrangement is ideally suited for more efficient use of overlapping multi-part access probes according to the present invention. As discussed above, because an access signal that is not successfully received can be sent again before an entire conventional access period has passed, even unacquired or failed access signals can more efficiently gain access to the communication system. In addition, when there are additional offset access channels provided or shorter time slots being used, the likelihood of non-acquisition decreases along with the time to re-send and acquire access signals.

IX. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention. For example, the invention is equally suited for transmissions other than access channel transmissions that are spread with multiple code sequences.

What we claims as our invention is:

1. A system for transmitting multi-part access probes over a slotted random access communications channel having a plurality of access channel slots, each of said access probes including an access message, the system comprising:

a first modulator for modulating a first part and a second part of the access probe with a short pseudonoise sequence;

a second modulator for modulating said second part of the access probe with a long pseudonoise sequence;

a data modulator for modulating said second part with the access message; and a transmitter for transmitting the access probe so that said first part falls within one of the access channel slots.

2. The system of claim 1, wherein the length of said short PN sequence is $2^8$ chips.

3. The system of claim 1, wherein the length of said long PN sequence is $2^{42}$ chips.

4. The system of claim 1, wherein said short PN sequence is a pair of quadrature short pseudonoise sequences.

5. The system of claim 1, wherein each of said access channel slots has first and second guard bands, wherein said means for transmitting further comprises:

means for transmitting the access probe so that said first part falls within one of the access channel slots between said first and second guard bands.

6. A system for receiving a multi-part access probe over a slotted random access communications channel having a plurality of access channel slots, each of the access probes including a first part modulated with a short pseudonoise sequence and a second part modulated with the short pseudonoise sequence and a long pseudonoise sequence, the system comprising:

a plurality of demodulators for demodulating the access probe; and a searcher receiver for acquiring and despreading the access probe and passing said despread access probe to one of said plurality of demodulators.

7. The system of claim 6, wherein the slotted random access communications is a slotted ALOHA channel.

8. A method for transmitting multi-part access probes over a slotted random access communications channel having a plurality of access channel slots, each of said access probes including an access message, the method comprising the steps of:

modulating a first part and a second part of the access probe with a short pseudonoise sequence;

modulating a second part of the access probe with a long pseudonoise sequence;

modulating said second part with the access message; and transmitting the access probe so that said first part falls within one of the access channel slots.

9. The method of claim 8, wherein the length of said short pseudonoise sequence is $2^8$ chips.

10. The method of claim 8, wherein the length of said long pseudonoise sequence is $2^{42}$ chips.

11. The method of claim 8, wherein said short pseudonoise sequence is a pair of quadrature short pseudonoise sequences.

12. The method of claim 8, wherein each of said access channel slots has first and second guard bands, further comprising the step of:

transmitting the access probe so that said first part falls within one of the access channel slots between said first and second guard bands.

13. A method for transmitting a plurality of access signals over at least one access channel, each including preamble and message portions with the preamble having first and second stages, comprising the steps of:

modulating the first stage and second stage of the preamble by a first signal;

modulating the second stage of the preamble also by a second signal;

modulating the message with said first signal and said second signal; and transmitting said modulated access signal in the form of said first stage, said modulated second stage, and said modulated message so that said preamble falls within one of a plurality of preselected time slots whose length corresponds substantially to that of said first stage.

14. The method of claim 13, wherein more than one access signal is transmitted in time such that a second stage or message portion overlaps the first stage of one or more other transmitted access signals.

15. The method of claim 13, further comprising guard bands forming boundaries for said preselected time slots.

16. The method of claim 13, wherein said modulated first stage of the preamble is transmitted for a sufficient time for a receiver to acquire a timing of said first signal.

17. The method of claim 16, wherein said modulated second stage of the preamble is transmitted for a sufficient time for a receiver to acquire a timing of said second signal.

18. The method of claim 13, wherein said first signal is a pair of quadrature spreading, pseudonoise sequences.

19. The method of claim 18, wherein said second signal is a channelizing pseudonoise sequence.

20. The method of claim 19, wherein said access signal comprises a message following said preamble, said message modulated by said first code sequence and said second code sequence.

21. A method for using an access signal in a wireless communication system comprising:

transmitting an access signal including a preamble and a message, said preamble having a first stage of a predetermined first length and a second stage, said first stage having data modulated by a first signal, said second stage having data modulated by a second signal and said first signal; and receiving said access signal over an access channel divided into signal reception time slots that are substantially the same length as said first stage.

22. The method of claim 21, wherein the first stage of the preamble is comprised of null data.

23. The system of claim 21, wherein the second stage of the preamble is comprised of null data.

24. The method of claim 21, wherein said first signal and said second signal are PN sequences.

25. A method for using an access signal in a wireless communication system comprising:

transmitting an access signal including a preamble and a message, said preamble having a first stage of a predetermined first length and a second stage, said first stage having data modulated by a first signal, said second stage having data modulated by a second signal and said first signal; and receiving said access signal over a plurality of an access channels divided into signal reception time slots that are time offset from each other by a period substantially the same length as said first stage.

26. The method of claim 25, wherein the first stage of the preamble is comprised of null data.

27. The method of claim 25, wherein said first signal and said second signal are PN sequences.

28. The method of claim 25, further comprising guard bands forming boundaries for said signal reception time slots.

29. A method for acquiring a transmission at a receiver from a transmitter, the transmission having a preamble, the preamble having a first stage and a second stage, the method comprising the steps of:

performing a coarse search on the transmission received by the receiver during the first stage of the preamble, wherein the first stage of the preamble is modulated by a first signal, said coarse search to determine a timing offset of said first signal;

performing a fine search on the transmission received by the receiver during the second stage of the preamble, wherein the second stage of the preamble is modulated by said first signal and a second signal, said fine search to determine a timing offset of said second signal, wherein said timing offset of said second signal is determined using said first signal and said timing offset of said first signal; and demodulating the transmission using said first signal, said second signal, said timing offset of said first signal, and said timing offset of said second signal.

* * * * *